United States Patent [19]

Von Holdt

[11] Patent Number: 4,702,456
[45] Date of Patent: Oct. 27, 1987

[54] MOLD PIN LOCK

[76] Inventor: John W. Von Holdt, 6864 Lexington Ln., Niles, Ill. 60648

[21] Appl. No.: 904,618

[22] Filed: Sep. 8, 1986

[51] Int. Cl.⁴ ............................................ B29C 33/30
[52] U.S. Cl. ..................................... 249/165; 72/462;
100/918; 425/192 R; 425/595; 425/412;
425/450.1; 425/451.9
[58] Field of Search ................. 425/62, 406, 411, 412,
425/450.1, 451.9, 541, 542, 595, 190, 192 R,
193, 195; 249/144, 160, 163, 205, 165; 100/918;
72/462

[56] References Cited

U.S. PATENT DOCUMENTS

| | | | |
|---|---|---|---|
| 2,874,409 | 2/1959 | Quarnstrom | 299/205 |
| 3,111,100 | 11/1963 | Georgeff | 100/918 |
| 3,909,180 | 9/1975 | Von Holdt | 425/450.1 |
| 4,004,448 | 1/1977 | Von Holdt | 72/462 |
| 4,315,727 | 2/1982 | Black | 425/595 |
| 4,472,128 | 9/1984 | Ruhl | 425/451.9 |
| 4,487,564 | 12/1984 | Von Holdt | 425/451.9 |

Primary Examiner—Willard E. Hoag
Attorney, Agent, or Firm—Charles F. Pigott, Jr.

[57] ABSTRACT

A mold comprises at least two separable parts defining at least one parting line. In this invention, a passageway is defined in one of the separable parts, while a pin, positioned in the passageway, is secured to another of the separable parts. The passageway and pin extend essentially in the direction that the separable parts move to open and close their parting line. A slot is defined in the separable part that defines the passageway, the slot communicating between the passageway and the exterior of the mold. When the mold is closed, a portion of the pin occupies the slot. Accordingly, lifting means can enter the slot to engage the pin when the mold is closed, for lifting thereof, and longitudinal movement of the pin in the slot can be prevented, to lock the mold, while the pin is so engaged.

15 Claims, 4 Drawing Figures

MOLD PIN LOCK

BACKGROUND OF THE INVENTION

In von Holdt U.S. Pat. Nos. 3,909,180; 4,004,448; and 4,487,564, various systems are disclosed for retaining multiple piece molds and dies together while they are being lifted or otherwise manipulated. Molds and dies are often large and heavy. Accordingly, potentially severe accidents can take place, for example, while an injection mold is being lifted, when the user has forgotten to secure the mold pieces together in some manner. In that situation, one of the mold pieces which is not in contact with the lifting hook can slip loose and fall to the floor. The damage to the mold or die can result in thousands of dollars. Additionally, the consequences can be fatal if a person is struck by such a large piece of steel.

In accordance with this invention, an improved safety lock system is provided for molds, dies and equivalent devices (which are contemplated to be broadly included in the term "mold"). By this invention, a mold can exhibit a fail safe aspect, in which it cannot be lifted by a hook of predetermined proportions unless it is properly closed. Thus, in an industrial operation, the safety of the shop can be significantly improved simply by providing a lifting hook of predetermined proportions as the only available means of lifting the mold. In that circumstance, the mold cannot be lifted unless it is properly closed. Additionally, in preferred structures of this invention, once they are engaged with the hook, the mold cannot be opened until disengaged once again from the hook.

Accordingly, by this invention, workers in the shop cannot make a mistake in the lifting and other manipulation of a mold to cause accidental opening, and greater assurance of safety is provided.

Additionally, the improvement of this invention is structurally very simple and inexpensive to manufacture, for good economy as well as improved safety.

DESCRIPTION OF THE INVENTION

This invention relates to operable and closeable molds which comprise at least two separable parts defining at least one parting line. In accordance with this invention, a passageway is defined in one of the separable parts. A pin, which is positioned to be in the passageway (at least in the closed position of the mold), is secured to another of the separable parts. The passageway and pin extend essentially in the direction that the separable parts move to open and close their parting line.

A slot is provided in the separable part which defines the passageway, with the slot communicating between the passageway and the exterior of the mold. A portion of the pin occupies the slot when the mold is closed. As the result of this, lifting means can enter the slot to engage the pin when the mold is closed, for lifting thereof.

It can be seen that if the mold is open, the structure may be designed for the pin to be absent from the slot, in which circumstance the mold cannot be lifted, since it is the pin in the slot that is engaged by the lifting means, which may be a conventional hook and chain lifting system, or any other lifting device.

Preferably, means are provided to prevent longitudinal movement of the pin in the slot while engaged by the lifting means. This means for preventing longitudinal movement may typically comprise a transversely extending groove defined in the pin, positioned to occupy the slot when the mold is in closed position. As the result of this, the lifting means can engage the groove, with the result that the longitudinal movement of the pin is prevented while so engaged. This, in turn, can prevent opening of the mold as long as the groove is so engaged with a hook or the like of lifting means.

It is also preferred for the hook of such lifting means used to be proportioned to be incapable of entering into engaging relation with the pin in the slot except when the groove occupies the slot. In other words, if the mold is open, the pin will be absent, or otherwise displaced so that the groove is not in the slot. In this latter circumstance, the hook is proportioned to be too large to fit around the pin in the slot, absent the groove, so that the user cannot lift the mold until it is closed to expose the groove in the slot. Then, once the hook fits around the pin in engagement with the slot, the pin cannot move longitudinally, thus preventing mold opening until the hook is removed.

Additionally, for storage and shipping, strap means, typically a steel strap, may tightly surround the mold to be forcefully biased to occupy at least a portion of the groove. Accordingly, in this case, opening of the mold is prevented until the strap is removed.

Preferably, the slot may be adjacent the center of balance of the mold. Additionally, however, the slot may be positioned elsewhere, typically by providing a second hook and a site to connect the second hook on the mold which is at a counterbalancing position from the slot. By this means, a multiple parting line mold system may be safely locked, for example by defining the passageway across all of the various multiple, separable parts and their parting lines, while defining the slot in one end piece of the multiple piece mold, and securing the pin at the opposed end piece of the mold. By this means, grasping by a lifting hook of the grooved portion of the pin in such a slot will lock the whole mold, while a second lifting site adjacent the other end of the mold can permit it to be lifted in balanced manner.

DESCRIPTION OF SPECIFIC EMBODIMENTS

Figure 1:
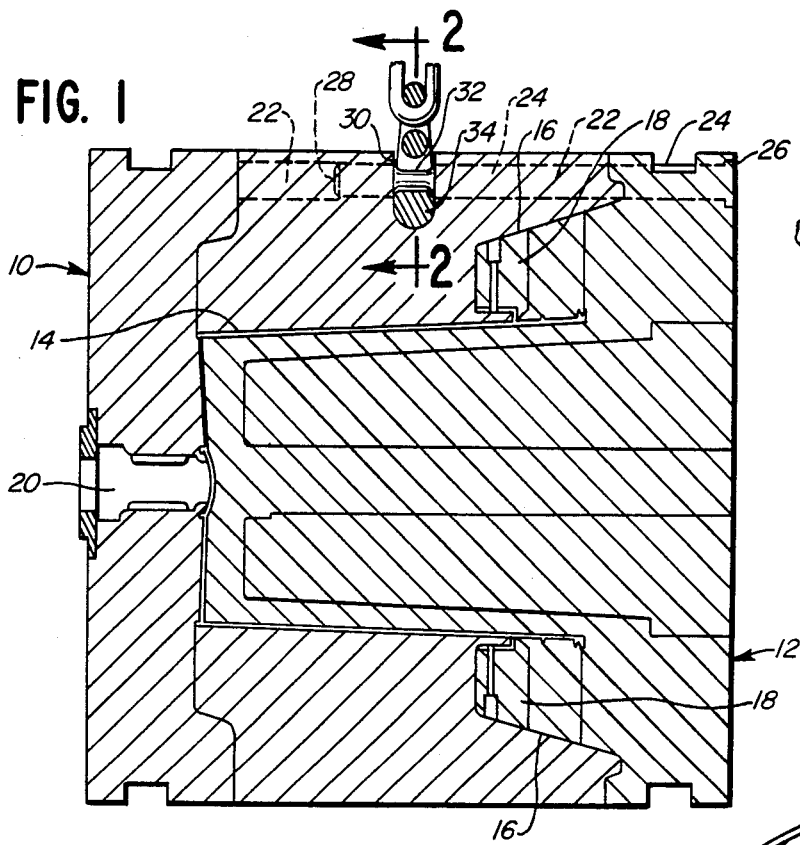
FIG. 1 is a longitudinal sectional view of a two-piece injection mold, shown in process of being lifted by the safety pin lifting means of this invention.
Figure 2:
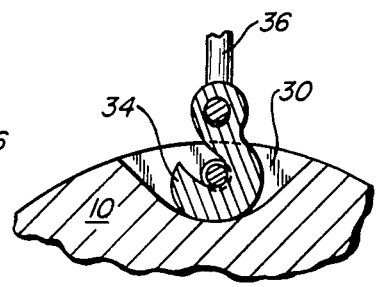
FIG. 2 is a sectional view taken along line 2—2 of FIG. 1.

Referring to FIGS. 1 and 2, an injection mold is disclosed, of conventional construction except as otherwise specifically indicated herein. Mold cavity 10 meets with mold core 12 to define a mold chamber 14, which in this specific instance is for the purpose of defining a bucket. Cavity 10 and core 14 are separable, each defining one side of mold chamber 14, separating along parting line 16.

Other conventional structures such as stripper ring 18, sprue aperture 20, and the like are provided. Certain conventional parts of a large injection mold are not shown in the drawing, for example, water cooling lines, angle pins, and the like.

In accordance with this invention, mold cavity 10 defines a passageway 22 near one edge thereof, positioned in the direction that cavity 10 and core 12 move to open and close.

Pin 24 is secured by the action of enlarged flange 26 in mold core 12. Pin 24 extends into passageway 22 in slideable relation therewith, and defining inner end 28.

Additionally, cavity 10 defines a slot 30 communicating between passageway 22 and the exterior of the mold. Pin 24 further defines an annular groove 32 which is positioned so as to occupy slot 30 when the mold is in closed position as in FIG. 1. Hook member 34 is provided as part of chain lifting means or the like for the lifting and moving the mold. Preferably, hook 34 fits snugly around pin 22 at annular groove 32 in slot 30.

Figure 3:
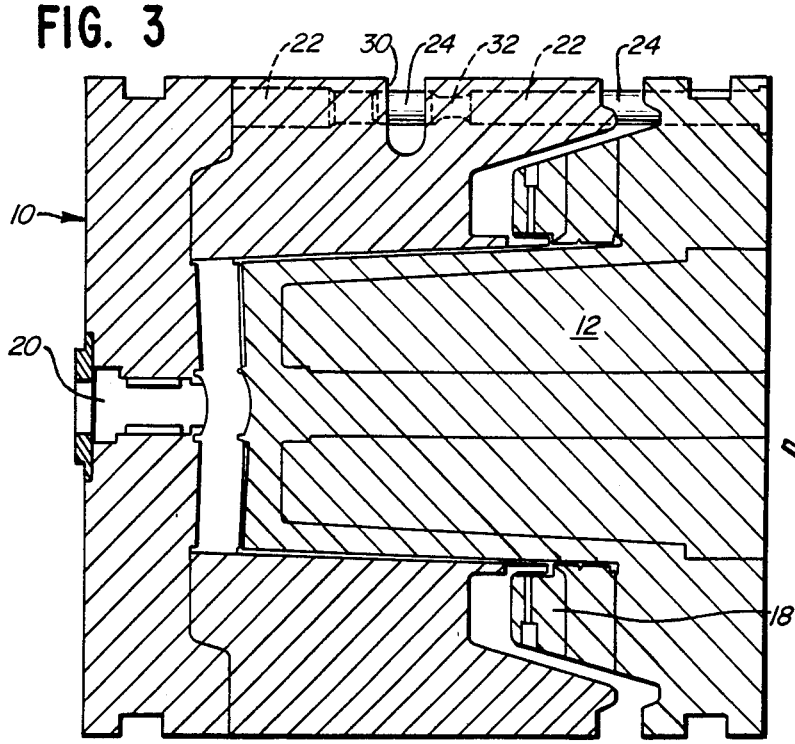
FIG. 3 is a longitudinal sectional view similar to FIG. 1, showing the mold in partially opened condition, resulting in its not being liftable in the manner of FIG. 1.

This proportioning of hook 34 provides a significant advantage as shown in FIG. 3, where the mold is slightly opened, so that groove 32 is displaced and no longer resides in slot 30. Under this circumstance, it would not be possible for the same hook 34 to grasp pin 34 in slot 30, since the space provided by groove 32 is necessary for hook 34 to fit in the slot. Thus, in the situation of FIG. 3, the mold cannot be engaged by hook 34 and lifted by lifting means 36. This not only alerts the users to the fact that the mold is open, but it prevents them from making a mistake that could result in a serious accident.

Additionally, when hook 34 is engaged with pin 24 as in FIG. 1, it can be seen that pin 24 cannot slide longitudinally in passageway 22, being prevented from doing so by the presence of the snugly fitting hook 34 within groove 32. Thus, by this simple expedient, a mold can be lifted and moved without danger of opening.

Figure 4:
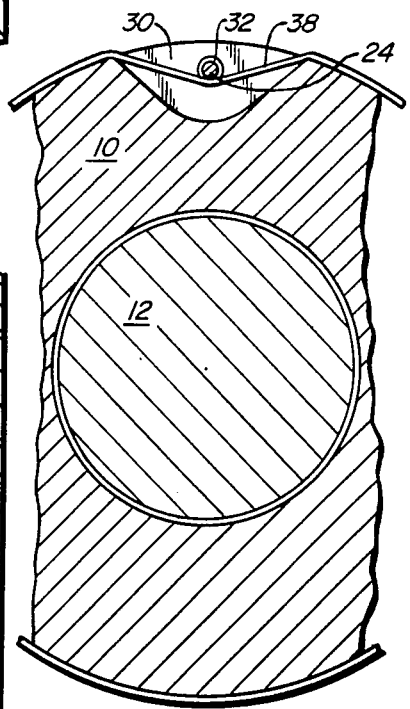
FIG. 4 is a transverse sectional view of the mold of FIG. 1 showing how a steel strap or the like may be used to secure the two mold portions together for lifting.

Referring to FIG. 4, a transverse section of the mold shows cavity 10 and core 12 being retained by a steel strap 38 tightly surrounding the mold. Strap 38 crosses underneath pin 24, being tightly biased for retention within groove 32. This configuration may be used for shipping the mold, and serves to prevent opening thereof until strap 38 is removed.

Thus, by the simple expedient disclosed above, a significant safety improvement may be provided to protect the mold from damage and workers in the shop from injury.

The above has been offered for illustrative purposes only, and is not intended to limit the scope of the invention of this application, which is as defined in the claims below.

That which is claimed is:

1. In an openable and closeable mold which comprises at least two separable parts defining at least one parting line, the improvement comprising, in combination:

a passageway defined in one of said separable parts; a pin positionable to be in said passageway, said pin being secured to another of said separable parts; said passageway and pin extending essentially in the direction that said separable parts move to open and close along their parting line; a slot defined in said one separable part communicating between said passageway and the exterior of said mold, a portion of said pin occupying said slot when the mold is closed, whereby lifting means can enter said slot to engage said pin when the mold is closed, for lifting thereof.

2. The mold of claim 1 in which means are provided to prevent longitudinal movement of said pin in the slot when engaged by said lifting means.

3. The mold of claim 2 in which said preventing means comprises a groove in said pin, positioned to occupy said slot when the mold is in closed position, whereby said lifting means can engage the grooved portion of said pin said slot to prevent said longitudinal movement while so engaged.

4. The mold of claim 3, in which said lifting means is present, including a hook in engaging relation with said groove portion of said pin, said hook being proportioned to be incapable of lifting engagement with said pin in the slot except when the groove occupies said slot.

5. The mold of claim 3 in which said groove is an annular groove.

6. The mold of claim 2 in which said preventing means comprises a groove defined by said pin, positioned to occupy said slot when the mold is in closed position, and strap means tightly surrounding said mold and forcefully biased to occupy at least a portion of said groove, whereby opening of said mold is prevented.

7. The mold of claim 6 in which said groove is an annular groove.

8. The mold of claim 2 in which said slot is adjacent the center of balance thereof.

9. In an openable and closeable mold which comprises a pair of separable parts defining a parting line, the improvement comprising, in combination:

a passageway defined in one of said separable parts; a pin positionable to be in said passageway, said pin being secured to the other of said separable parts; said passageway and pin extending essentially in the direction that said separable parts move to open and close along their parting line; a slot defined in said one separable part communicating between said passageway and the exterior of said mold; a portion of said pin occupying said slot when the mold is closed, said portion of the pin defining a groove, whereby lifting means can enter said slot to engage said pin and groove when the mold is closed, for lifting thereof.

10. The mold of claim 9 in which said slot is adjacent to the center of said balance of said mold.

11. The mold of claim 10 in which a hook as part of said lifting means is present in engaging relation with said pin and said slot, for lifting said mold, said hook being proportioned to be incapable of lifting engagement with said pin except when the groove occupies said slot.

12. The mold of claim 10 in which said groove is an annular groove.

13. In an openable and closeable mold which comprises a pair of separable parts defining a parting line, the improvement comprising, in combination:

a passageway defined in one of said separable parts; a pin positionable to be in said passageway, said pin being secured to another of said separable parts; said passageway and pin extending essentially in the direction that said separable parts move to open and close along their parting lines; a slot defined in said one separable part communicating between the passageway and the exterior of the mold, a portion of said pin occupying said slot when the mold is closed, said portion of the pin defining a transverse groove; and strap means tightly surrounding said mold and forcefully biased to occupy at least a portion of said transverse groove, whereby opening of said mold is prevented.

14. The mold of claim 13 in which said groove is an annular groove.

15. The mold of claim 13 in which said slot is adjacent the center of balance thereof.

* * * * *